US005752158A

United States Patent [19]

Stephenson et al.

[11] Patent Number: 5,752,158
[45] Date of Patent: May 12, 1998

[54] THERMAL PROCESS FOR THE CONVERSION OF URANIUM HEXAFLUORIDE

[75] Inventors: Michael J. Stephenson, Oak Ridge; Waldo R. Golliher; Paul Haas, both of Knoxville, all of Tenn.

[73] Assignee: M4 Environmental L.P., Oak Ridge, Tenn.

[21] Appl. No.: 657,937

[22] Filed: May 30, 1996

Related U.S. Application Data

[63] Continuation-in-part of Ser. No. 635,190, Apr. 19, 1996.
[51] Int. Cl.$^6$ ................................................ C01G 43/01
[52] U.S. Cl. .......................................... 423/261; 423/260
[58] Field of Search ............................. 423/260, 261

[56] References Cited

U.S. PATENT DOCUMENTS

| | | | |
|---|---|---|---|
| 3,260,575 | 7/1966 | Heestand et al. | 23/355 |
| 3,970,581 | 7/1976 | Jeter et al. | 423/260 |
| 4,003,980 | 1/1977 | Watt et al. | 423/261 |
| 4,005,042 | 1/1977 | Dada | 423/260 |
| 4,031,029 | 6/1977 | Colter et al. | 423/260 |
| 4,090,976 | 5/1978 | De Hollander | 423/261 |
| 4,698,214 | 10/1987 | Linz et al. | 423/260 |
| 4,808,390 | 2/1989 | Tanaka et al. | 423/261 |
| 4,830,841 | 5/1989 | Urza | 423/261 |
| 5,346,684 | 9/1994 | Mestepey | 423/488 |

*Primary Examiner*—Edward A. Miller
*Attorney, Agent, or Firm*—Cushman Darby & Cushman IP Group Pillsbury Madison & Sutro LLP

[57] ABSTRACT

A single-step process for producing solid uranium oxide and gaseous HF from $UF_6$ which comprises bringing together two gaseous reactant streams, one of said streams comprising $UF_6$ optionally admixed with oxygen as $O_2$, and the second reactant stream comprising a mixture of hydrogen as $H_2$ or as a hydrogen-containing compound and oxygen as an oxygen-containing compound, said gaseous reactant streams being brought together at a temperature and composition such that the $UF_6$ is converted rapidly by flame reaction into readily separable solid uranium oxide and a gaseous HF product.

24 Claims, 5 Drawing Sheets

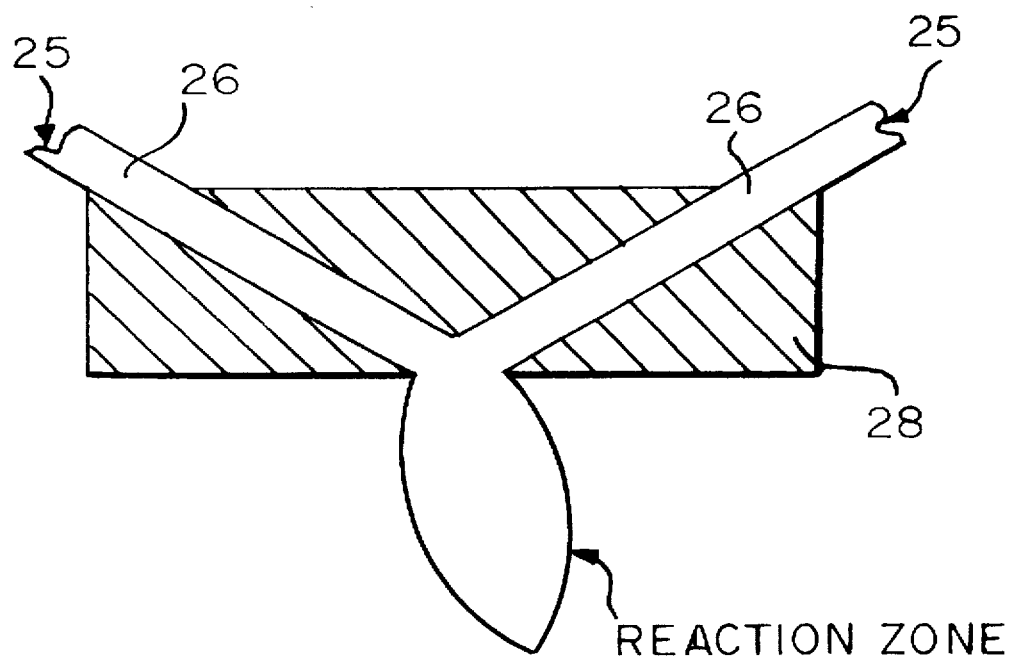

THERMAL PROCESS FOR THE CONVERSION OF URANIUM HEXAFLUORIDE

RELATED APPLICATION

This is a continuation-in-part of U.S. application Ser. No. 08/635,190, filed Apr. 19, 1996, the contents of which are incorporated herein by reference.

FIELD OF THE INVENTION

The present invention relates to a thermal process for the conversion of uranium hexafluoride ($UF_6$) to give solid uranium oxide (essentially $UO_2$) and hydrogen fluoride (HF). The process represents an efficient way of converting $UF_6$ to $UO_2$ with recovery of the attendant fluorine as HF by a single-step procedure involving two gaseous feed streams.

BACKGROUND TO THE INVENTION

The separation of uranium isotopes for defense needs and the preparation of commercial nuclear fuels have mainly been by processes that produce enriched and depleted uranium (i.e., enriched or depleted in the uranium-235 isotope) as $UF_6$. Much of the enriched $UF_6$ is converted to $UO_2$ by processes selected to give the ceramic sinterability needed for preparation of nuclear fuel pellets. The much larger amounts of depleted $UF_6$ from the enrichment process are mostly stored as solid $UF_6$ in steel cylinders.

As of July, 1995, the U.S. Department of Energy had over 600,000 MT of depleted $UF_6$ (containing over 400,000 MT of uranium) stored in approximately 66,000 cylinders. Long term strategies for management of this depleted uranium require conversion of the $UF_6$ to uranium oxides. However, while procedures for converting $UF_6$ to uranium oxides are known, the currently available procedures are not particularly efficient or economical for converting depleted $UF_6$ to solid uranium oxides, notably $UO_2$, suitable for disposal, storage, or further use. More specifically, the $UF_6$ conversions for nuclear fuels were developed to prepare $UO_2$ with well controlled ceramic properties and are not optimum for the much larger-scale conversions of depleted uranium. Furthermore, because of the need to control their ceramic properties and the thermodynamic limitations, the known commercial conversion processes are complex with multiple process stages and include the formation of intermediate solids such as $UO_2F_2$ or $UF_4$. Additionally, the fluorine by-products of these conversion processes are usually radioactive wastes with high disposal costs.

Uranium oxides are thermally and chemically stable, non-volatile and essentially insoluble in rain and ground water, and are the preferred compositions of uranium for long term storage or disposal. The most stable oxide in the environment is $U_3O_8$, but other oxides ranging from $UO_2$ to $U_4O_9$ and $UO_3$ and combinations of oxides are also acceptable products. Uranium and fluorine are very reactive elements chemically and, the conversion of $UF_6$ to uranium oxides also produces a fluorine compound as a product. While some fluorine compounds have little commercial value and represent waste products with consequent disposal costs, hydrogen fluoride is a valuable commercial chemical with many uses to provide a market for the fluorine in the depleted $UF_6$.

The conversion of $UF_6$ into uranium oxides and HF requires reaction with oxygen as $O_2$ or compounds containing oxygen and with hydrogen as $H_2$ or compounds containing hydrogen. One process used to prepare nuclear fuel $UO_2$ from enriched $UF_6$ uses gross excesses of water vapor and $H_2$ in two steps with the two principal reactions being:

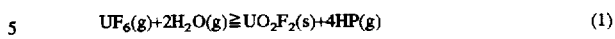

$$UF_6(g)+2H_2O(g) \rightleftarrows UO_2F_2(s)+4HF(g) \quad (1)$$

and

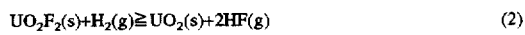

$$UO_2F_2(s)+H_2(g) \rightleftarrows UO_2(s)+2HF(g) \quad (2)$$

where (g) and (s) represent, respectively, gas and solid. The preferred sequence is to perform reaction (1) at about 250° C. followed by reaction (2) at about 650° C.

The complete conversion of the uranium solids to $UO_2$ as represented by reaction (2) requires good contact of the solids and gas over a relatively long period of time, on the order of an hour or more. Other known conversion processes are precipitation of ammonium diuranate or ammonium uranyl carbonate from reaction of $UF_6$ with aqueous solutions. All of these processes require multiple steps and give dilute aqueous fluoride solutions of little or no value as the fluoride product. Nevertheless, these conversion reactions are chosen because they give the resulting uranium oxide the ceramic properties needed for fabrication of nuclear fuels.

Numerous U.S. patents have been issued directed towards processes for the conversion of $UF_6$ to uranium oxides. See, for example, U.S. Pat. No. 4,830,841 and the U.S. patents listed therein which describe procedures for converting $UF_6$ to uranium dioxide in furnaces, rotary kilns, fluidized beds or the like. As representative of such art, it is noted that U.S. Pat. No. 4,830,841 itself is concerned with a process for preparing $UO_2$ from $UF_6$ by reacting $UF_6$ with steam to produce submicron uranyl fluoride powder, fluidizing a bed of uranium oxide material with a mixture of steam, hydrogen and inert gas at about 580° C. to about 700° C., and introducing the submicron uranyl fluoride powder into the fluidized bed of uranium oxide material so that the uranyl fluoride powder is agglomerated, densified, fluidized, defluorinated and reduced to a fluoride-containing uranium oxide material which is removed from the fluidized bed and then contacted with hydrogen and steam at elevated temperature to obtain $UO_2$ essentially free of fluoride.

Another U.S. Pat. No. 3,260,575 describes the preparation of ceramic $UO_2$ fuel material by a single-step process comprising the reaction of $UF_6$ with a stoichiometric excess, generally at least 1.5 times the stoichiometric amount, and preferably much larger (e.g., 30–40 times the stoichiometric amount) of a gaseous mixture of hydrogen and oxygen-bearing gas at a temperature above 1100° C. and a pressure not exceeding 20 torr., i.e. 20 mm Hg absolute. The patent specifies that a temperature of at least 1100° C. is required to avoid the formation of $UF_4$ and that a pressure less than 20 torr is critical, fluoride intermediates being produced along with $UO_2$ at higher pressures.

Another process directed towards the recovery of anhydrous hydrogen fluoride from $UF_6$ gas is disclosed in U.S. Pat. No. 5,346,684 (equivalent to EP 529768 A1). That process involves reacting $UF_6$ in a primary reactor with steam to produce a uranyl fluoride intermediate and a gaseous mixture of hydrogen fluoride and water. The uranyl fluoride is then fed to a secondary reactor and reacted with water to produce a $U_3O_8$ product for disposal and a gaseous mixture of water, HF and oxygen. The gaseous mixtures from the two reactors are combined and then distilled to obtain an anhydrous HF product. An azeotrope of water and HF is vaporized and returned to the primary reactor.

Another prior process for converting $UF_6$ to uranium oxides involves feeding the $UF_6$ into a molten metal bath where the $UF_6$ is broken down into recoverable components including uranium oxide and HF.

Notwithstanding the extensive prior efforts referred to above, there remains a substantial need for improved procedures for converting $UF_6$, particularly depleted $UF_6$, into solid $UO_2$ in a form suitable for storage, disposal or use. The primary object of the invention is to provide such a process. Other objects, including, for example, the provision of HF in concentrated aqueous solution or in other highly useful form, such as anhydrous HF, will also be evident from the description of the invention which follows.

SUMMARY OF THE INVENTION

The invention provides a single-step process for efficiently converting $UF_6$ into solid $UO_2$ and gaseous or condensed phase HF. The process involves bringing together two gaseous reactant streams, one of the streams comprising $UF_6$ optionally admixed with oxygen as $O_2$, and the second reactant stream comprising a mixture of hydrogen as $H_2$ or as a hydrogen-containing compound and oxygen as an oxygen-containing compound, the gaseous reactant streams being brought together at a temperature, pressure and composition such that the $UF_6$ is converted rapidly by flame reaction into readily separable solid uranium oxide (essentially $UO_2$) and a gaseous HF product. While the composition of the two gaseous reactant streams can be varied, as discussed hereafter, care should be taken to avoid using mixtures which might create an explosive potential. For example, the second reactant stream preferably does not include the combination of $H_2$ and $O_2$ because of the possibility of an explosion.

The present process is primarily intended for use with depleted $UF_6$. However, the process can also be used with natural assay or enriched $UF_6$. In either case, a solid oxide consisting essentially of $UO_2$ and a gaseous HF product are obtained. These are readily separated from each other with the gaseous HF product being condensed to provide a highly concentrated aqueous HF solution or anhydrous HF. This fluoride product can be used directly by the chemical industry for the manufacture of fluorine ($F_2$) or replacement refrigerants (e.g., non-chlorofluorocarbons) or by the uranium industry for the manufacture of $UF_4$ and $UF_6$. The solid $UO_2$, which is readily collectable, is easily recovered for storage or use.

The process is not sensitive to the pressure of the reactants and the operating pressure of the system can be varied to accommodate sizing and throughput requirements. However, it is particularly important to the usefulness of the process that the gaseous reactant streams are brought together and reacted at a pressure which is essentially atmospheric or above, although in some circumstances, it may be desirable to operate at a pressure slightly below atmospheric.

An important distinguishing feature of the present process over prior procedures is that it does not involve the use of fluidized beds, molten metal or the like to obtain the desired products. In essence, the present process simply involves bringing the two gaseous reactant streams together so that a flame reaction occurs and collects the resultant solid oxide product and gaseous HF product.

DESCRIPTION OF PREFERRED EMBODIMENTS

Preferably the feed stream comprising $UF_6$ contains at least part of the oxygen needed for the reaction, the balance, if any, of the oxygen being included in the second feed stream. The oxygen in the $UF_6$ feed stream should only be in the form of $O_2$ to avoid the potential for premature reactions. It is also preferred that the $UF_6$ feed stream does not contain $H_2$.

The hydrogen in the second reactant stream can be in the form of $H_2$ or as a hydrogen-containing compound such as $H_2O$, $NH_3$ and/or $CH_4$. Preferably all of the hydrogen needed for the reaction is in the second feed stream. Desirably, the second feed stream comprises a mixture of $H_2$ and $H_2O$ or a mixture of $H_2$ and $CO_2$.

While the composition of each gaseous reactant stream can be varied, care must be taken in preparing each stream to avoid the possibility of creating an explosion potential or premature reaction. For example, undesirable mixtures include $H_2$ and $O_2$, $UF_6$ and $H_2O$, $UF_6$ and $H_2$, $NH_3$ and $O_2$, $CH_4$ and $O_2$. Typical useful mixtures include, without limitation thereto, $UF_6$ and $O_2$; ($H_2$ and/or $NH_3$) and $H_2O$, ($NH_3$ and/or $H_2$) and $CO_2$; and $CH_4$ and $H_2O$.

One or both feed streams may also include an inert gas such as argon or nitrogen.

The reaction can be carried out over a relatively wide temperature range such as between 900° C. to 1500° C. or higher, e.g. up to 2000° C., with a temperature of around 1100° C. being generally preferred. The reaction temperature or, stated otherwise, the temperature of the reaction product, can be controlled by varying the amount of oxygen in the $UF_6$ feed stream and the flow rate of the gases used for the reaction.

The reaction can be carried out over a relatively broad pressure range such as between atmospheric and 250 psia. It may be useful in some cases to operate at slightly below atmospheric, e.g. at about 10 to 13 psia, and possibly as low as 5 psia, but atmospheric or essentially atmospheric pressure is preferred. If a temperature in excess of 2000° C. is used, the pressure is preferably decreased below atmospheric to minimize the formation of undesired by-products (e.g. $UF_4$).

The ratio of hydrogen and oxygen to $UF_6$ can also be varied to control the amount of water vapor in the gaseous HF product. However, generally speaking, the amounts of oxygen and hydrogen in the feed gases, i.e., the total amount of oxygen and hydrogen used in the process, should be less than about 1.5 times the stoichiometric amounts needed for reaction with the $UF_6$ to form $UO_2$ and HF. Preferably the hydrogen and oxygen are used near (i.e., around 10–30% in excess of) the stoichiometric amounts.

A particularly unique feature of the invention is the finding that the desired reaction to provide $UO_2$ and HF can be accomplished in a very short period of time. Typical reaction times are on the order of fractions of a second although times in excess of this can be used.

Advantageously the process is carried out using a closed crucible or reactor made of suitable refractory material, e.g. graphite or alumina. High melting point nickel and nickel alloys that form stable metal fluorides can also be used. The gaseous reactant streams are fed separately to the reactor. Within the specified temperature range of the invention, the reactant streams react essentially spontaneously on contact within the reactor $UO_2$ provide solid $UO_2$ and gaseous HF. The $UO_2$ can be collected from the bottom of the reactor or filtered from the reactor off-gas while the HF may be withdrawn from multiple points, e.g. reactor top or side, and, if desired, condensed.

Advantageously, the reactant streams are fed into the reactor to obtain intimate mixing of the reactants such as through a concentric tube arrangement, with the $UF_6$ gas being fed through, for example, the inner tube and the other gaseous reactant stream being fed through an outer tube. The desired reaction occurs at the exit or discharge ends of the concentric tubes where the reactant streams come together. Alternatively, the gaseous reactant streams can be fed to separate inlets of a nozzle arrangement rather than using concentric tubes, the reactant streams being brought together at or just before the nozzle discharge. In either case, one or both of the reactant streams can be preheated, for example, to 700°–1000° C. The reaction does not require the application of additional heat as the overall reaction is an exothermic one. With appropriate selection of the composition of the reactant gas streams, an equilibrium reaction temperature of around 900°–2000° C. is readily attained. Preheating of the reactant gas streams is generally desirable, particularly if oxygen is not included in the $UF_6$ reactant gas.

A suitable way of practicing the invention comprises the use of a burner designed to receive $UF_6$ in one feed stream which may also contain $O_2$ and another separate feed stream comprising $H_2O$ or $CO_2$ which also contains the principal source of hydrogen as $H_2$, $NH_3$ or $CH_4$. The $O_2$ and $H_2O$ and/or other oxygen-containing compounds together should preferably supply a slight excess, e.g. 10 to 20 percent over the stoichiometric amount, of oxygen over that needed to form $UO_2$. The $H_2O$ and/or other hydrogen-containing compounds together should also supply a slight excess of hydrogen over that needed to form HF. The excess of oxygen forms CO if carbon is present and $H_2O$ if excess hydrogen is present. While a stoichiometric excess of hydrogen and/or oxygen is generally preferred, it is recognized that sub-stoichiometric amounts of hydrogen and/or oxygen can also be used to provide a somewhat different uranium oxide product distribution.

As noted earlier, the oxygen feed rate (when $O_2$ is admixed with $UF_6$) is used to control the temperature of the products of reaction. Without oxygen feed, the gases should preferably be preheated to control the temperature of the products of reaction in the desired range specified for the present process, i.e. 900°–2000° C. or higher.

BRIEF DESCRIPTION OF THE DRAWINGS

The invention is further described by reference to the accompanying drawings wherein:

FIG. 5 diagrammatically illustrates another arrangement for bringing the reactant streams together for reaction.

Figure 1:
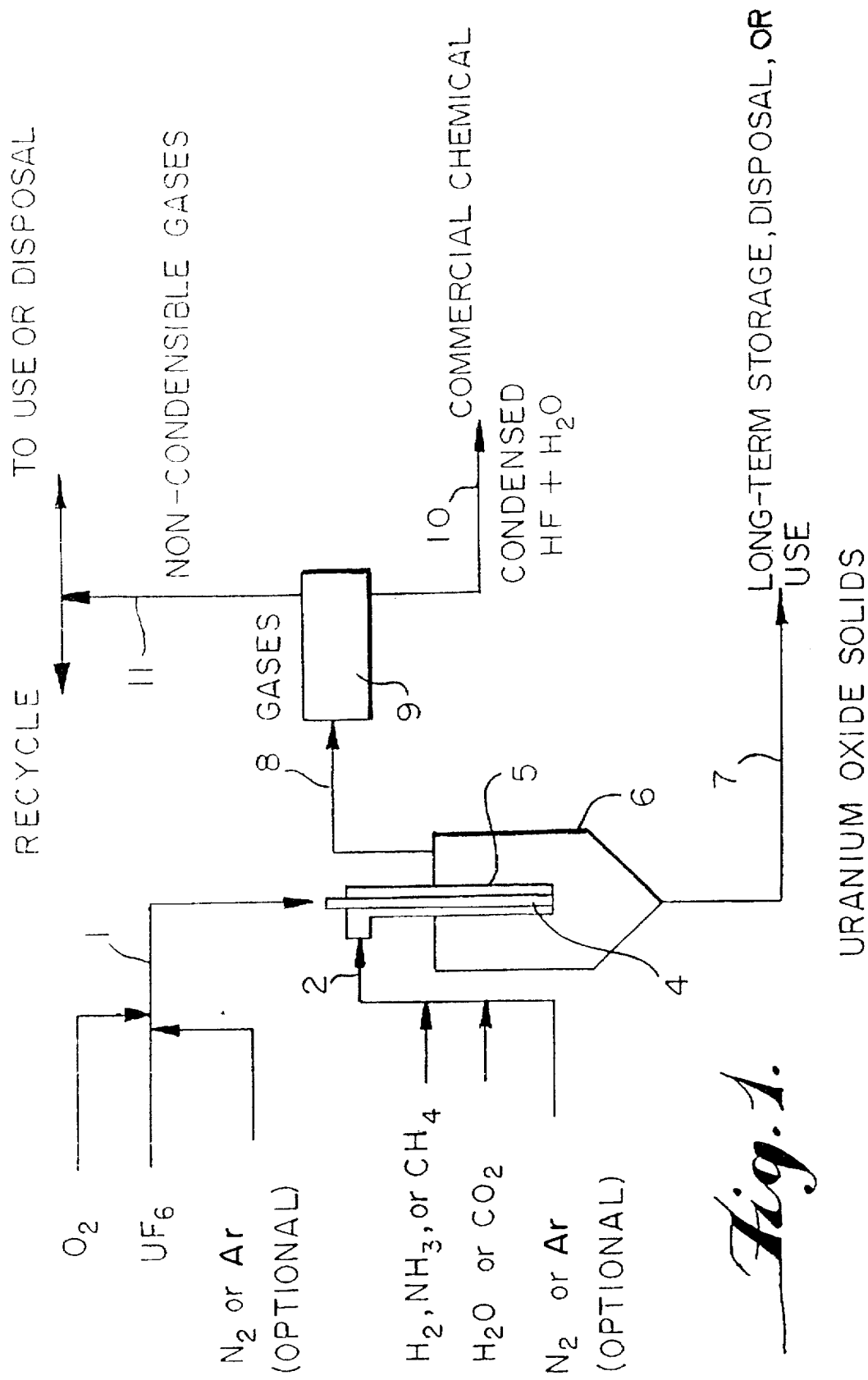
FIG. 1 is a flow diagram showing one arrangement for practicing the present process.

With more specific reference to FIG. 1, two gaseous reactant streams (1) and (2) are fed continuously to a lance or burner (3) comprising a pair of concentric tubes (4) and (5) positioned within the reaction vessel (6).

A pre-heated gaseous mixture of $UF_6$ and $O_2$, optionally including an inert gas such as $N_2$ or argon, is fed through the inner tube (4) while a pre-heated gaseous mixture of $H_2$, $NH_3$ and/or $CH_4$ and $H_2O$ or $CO_2$, optionally with inert gas such as $N_2$ or argon, is fed through the outer tube (5). Optionally, gaseous feeds are heated in the lance or burner (3) by an external heating source on vessel (6). The two gaseous streams mix and essentially simultaneously react at the discharge ends of the tubes to form $UO_2$ and HF without any significant accumulation of intermediate uranium compounds as solids. The reaction products discharge into the lower portion of vessel (6) which is preferably provided with means to facilitate separate discharge of gases and solids. The uranium oxides are recovered at (7) as dry, granular solids suitable for known methods of storage, disposal or use. The gaseous products collected at (8) are filtered (not shown) to remove entrained solids and cooled in condenser (9) to allow separation of condensed HF and residual $H_2O$ (10). By appropriate selection of the composition of the reactant streams, the amount of water formed in the reaction can be controlled to provide the desired concentration of HF solution resulting from the condensation at (10). The resulting condensed product has many commercial uses as collected in the form of highly concentrated aqueous HF or essentially anhydrous HF. The non-condensable gases (11) may be partly recycled to feed (1) or (2) or they may be totally discharged from the system for use or disposal.

Figure 2:
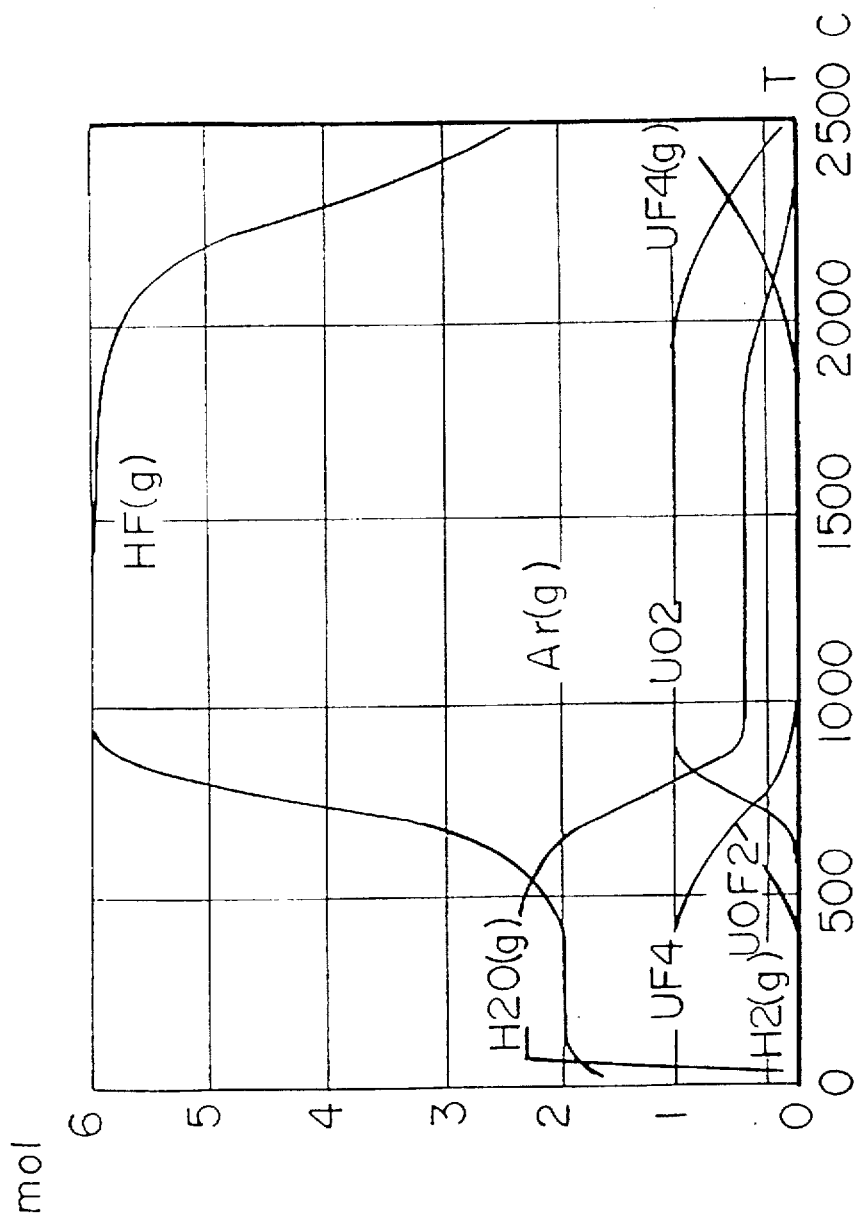
FIG. 2 graphically shows equilibrium compositions versus product temperature using a reaction arrangement as in FIG. 1.

FIG. 2 is discussed hereafter in connection with Example 2. The figure, as earlier noted, shows that the optimum results, with respect to the production of $UO_2$ and HF at atmospheric pressure, are realized at an equilibrium temperature in the range of 900° C. to 2000° C., particularly around 1100° C.

Figure 3:
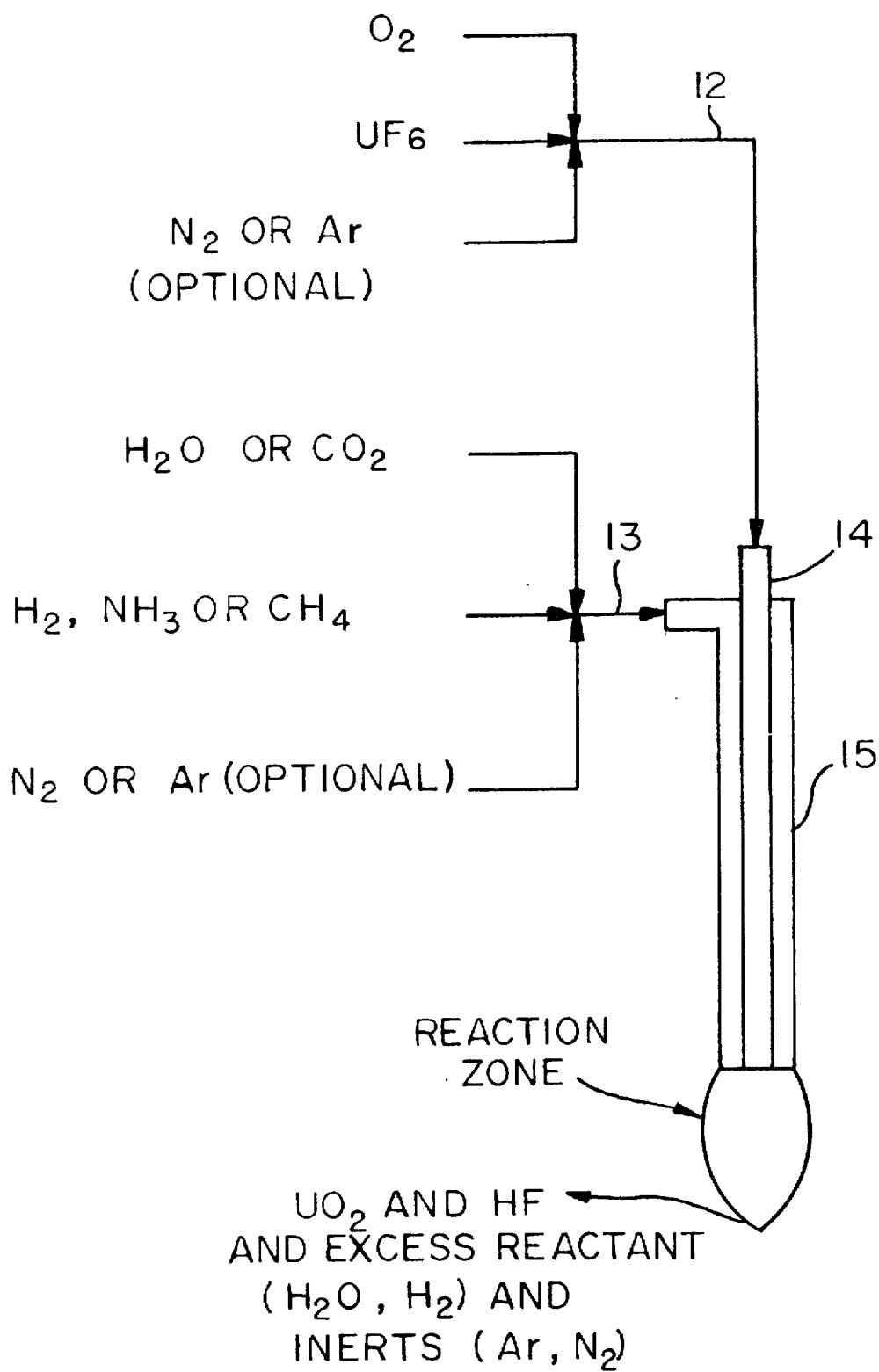
FIG. 3 diagrammatically shows in more detail one way of supplying the reactant gas streams to the reaction zone.

FIG. 3 shows a feed apparatus for introducing a pre-heated feed gas containing $UF_6$ and a second pre-heated feed gas containing compounds of hydrogen and oxygen. The $UF_6$ feed (12) flows through an inner tube (14) selected to be corrosion resistant for $UF_6$ and $O_2$ and for all the other gaseous feeds. The other gaseous feed mixture (13) flows through the annulus between the inner tube and a second, larger tube (15) selected to be corrosion resistant for HF and for the gaseous feed mixtures. $Al_2O_3$, nickel, and nickel alloy tubes can be used when they are passivated by a film of solid fluorides. Alternatively, other fluoride compatible materials, such as $CaF_2$ and lanthanum hexaboride, may also be used.

A third, large, graphite tube (not shown) can be placed around the tube (15) so as to provide for an inert gas flow to prevent excessive temperatures and, more importantly, avoid corrosion of the outer surface of tube (15). The $UF_6$ feed (12) includes a controlled supply of $O_2$ to regulate the reaction temperature and, optionally, $N_2$, argon or other inert gas. The feed (13), as shown, comprises $H_2$, $NH_3$ or $CH_4$ and $H_2O$ or $CO_2$ as the hydrogen and oxygen sources. Optionally, $N_2$, argon or other inert gas may also be included in feed (13). As in the case of the system shown in FIG. 1, the pre-heated gases issuing at the exits of tubes (14) and (15) flame react essentially simultaneously as they come in contact (see "Reaction Zone") to form the desired solid $UO_2$ and gaseous HF while leaving $H_2O$ and $H_2$ as excess reactants and inerts (Ar, $N_2$) in the embodiment as shown.

Figure 4:
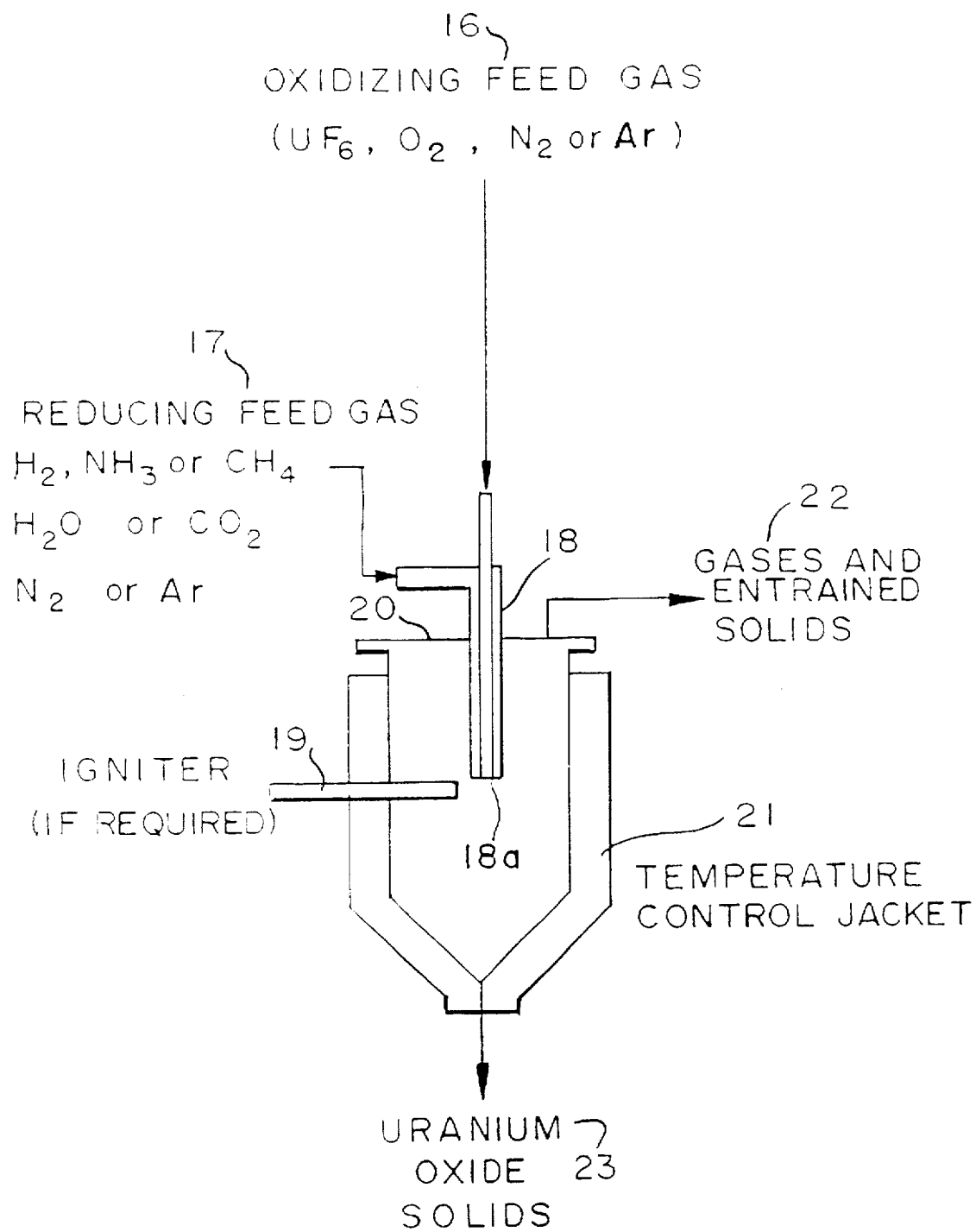
FIG. 4 shows an alternative flow diagram for the practice of the invention.

FIG. 4 shows an arrangement which is useful to avoid excessive temperatures or larger heat fluxes. In this embodiment, the pre-heated oxidizing feed gas (16) containing $UF_6$, $O_2$ and $N_2$ or argon and the pre-heated reducing feed gas (17) comprising a mixture of $H_2$, $NH_3$ or $CH_4$; $H_2O$ or $CO_2$; and $N_2$ or argon, flow through a lance or burner (18) to mix and react at the lance or burner tip 18a inside reactor vessel (20). Part or all of the solid uranium oxide product accumulates at (23) for periodic discharge from the reactor vessel (20). Gaseous products and any entrained uranium oxide solids exit continuously at (22) into a suitable separating system (not shown). The reactor temperature may be controlled by a combination of means for heating or cooling the reactor by jacket (21), control of the amount of $O_2$ in the feed stream (16), and pre-heat of the feed streams (16) and (17). Preheating the reactor by operation of the reactor as a burner without $UF_6$ and use of an ignition device (19) may also be employed as desired or if necessary to initiate the process. Generally speaking, the temperature and composition of the feed streams are such that when the two streams are brought together, a flame reaction occurs. If desired, however, the igniter (19) may be positioned at the point where the gaseous streams come in contact to assist in the initiation of the reaction, although this is not usually necessary, particularly if the gaseous streams have been preheated.

FIG. 5 shows an alternative to the concentric tube arrangement of FIG. 3. Thus, in FIG. 5, the reactant streams (24) and (25) are separately supplied through inlets (26) in nozzle means (28), the gases coming into contact adjacent the nozzle discharge where they react to form $UO_2$ and HF as in the FIG. 3 arrangement.

The invention is illustrated by the following examples:

EXAMPLE 1

An experiment was done with gas feeds to a feed apparatus generally as described in FIG. 1 except that the feed arrangement into the reactor comprised three concentric tubes rather than two as shown. A mixture of $UF_6$ at a rate of 250 g/hour and Ar was fed to an inner $Al_2O_3$ tube. A mixture of water vapor at about 31 g/hour, $H_2$ at 19 std liters/hour and Ar was fed into the annulus between the inner tube and a middle $Al_2O_3$ tube. Ar was fed into the annulus between the middle tube and an outer graphite tube. The assembly of tubes discharged into the reactor chamber at about 950° C. The uranium collected as solids beyond the tip of the inner tube with an estimated 0.1 second residence time between the end of the inner tube and the point of deposition of the uranium product. Analyses of the deposited solids by X-ray diffraction showed essentially pure $UO_2$ without detectable amounts of fluoride compounds.

EXAMPLE 2

Thermochemical calculations were made using a computer program [HSC Chemistry for Windows 1.2, Outokumpu Research OY, FORI, Finland] to determine the equilibrium compositions of products and the adiabatic temperature for reaction without heat transfer. The equilibrium compositions versus temperature at essentially atmospheric pressure (1.0 Bar) are shown in FIG. 2 for reaction of 1.0 mole of $UF_6$, 0.5 moles of $O_2$, 1.4 moles of $H_2O$, 2.2. moles of $H_2$ and 2 moles of Ar at atmospheric pressure. The equilibrium composition at 1100° C. is more than 99% conversion of the $UF_6$ to $UO_2$ and HF. With the feed gases pre-heated to 100° C., the product temperature would be 1108° C. The same equilibrium composition shown in FIG. 2 would also result if the same total molar amounts of hydrogen and oxygen were fed using other combinations of $H_2$, $H_2O$ and $O_2$. However, the adiabatic temperatures would be less than 500° C. for no $O_2$ (i.e., all the oxygen as $H_2O$) and over 2000° C. for no $H_2O$ (i.e., all the oxygen as $O_2$). This illustrates how the composition of the products and the temperature without heat flux can be controlled separately.

An important feature of the invention is that the $UF_6$ conversion reaction is completed quickly within a very short time and distance after the pre-heated $UF_6$ gas stream is mixed with the other reactant gas stream, e.g. a gas stream comprising $H_2O$ and $H_2$, possibly with an inert gas such as argon. Typically, the residence or reaction time is in the order of fractions of seconds, for example, 0.1 second using a total gas velocity at the tip of the feed lance or burner of about 3.5 feet per second.

Without intending to be limited to any particular theory of operation, the invention appears to be based on a number of important factors. These include the finding that, using particular reaction conditions and procedures, uranium oxide solids can be produced from a very rapid, one-step process for conversion of $UF_6$. Another important finding is that, by using the conditions described herein, and the indicated feed configurations, for example, one pre-heated gaseous stream comprising a mixture of $H_2O$ and $H_2$ and another preheated feed stream of $UF_6$, with or without oxygen and inert gas, conversion of $UF_6$ to essentially $UO_2$ solids can be obtained without significant accumulation of $UF_4$, $UO_2F_2$, or other uranium fluoride solids as intermediate compounds. Another important finding is that the adiabatic product temperature can be controlled by controlling the temperatures and compositions of the feeds.

It is known that $UF_6$ gas can be reacted with either $H_2$ or $H_2O$ gas to give useful conversions as follows:

$$UF_6(g)+H_2(g) \rightarrow 2HF(g)+UF_4(s) \qquad (1)$$

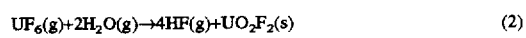

$$UF_6(g)+2H_2O(g) \rightarrow 4HF(g)+UO_2F_2(s) \qquad (2)$$

The first reaction is used as the initial step for preparation of enriched uranium metal from enriched $UF_6$. The $UO_2F_2$ from reaction (2) is not directly a useful product but can be an intermediate for conversion to commercial nuclear fuels by reaction (3):

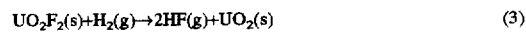

$$UO_2F_2(s)+H_2(g) \rightarrow 2HF(g)+UO_2(s) \qquad (3)$$

This conversion reaction of a solid with a gas is more difficult than reactions (1) or (2) where only gaseous reactants are involved. Reaction (3) commonly requires long times with good mixing of solids with an excess of $H_2$. Reaction (1) might be used in combination with reaction (4) to prepare $UO_2$ from $UF_6$:

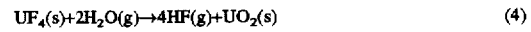

$$UF_4(s)+2H_2O(g) \rightarrow 4HF(g)+UO_2(s) \qquad (4)$$

Reaction (4) is much less practical than reaction (3) because it is less favorable thermodynamically and the $UF_4$ from reaction (1) is a fused solid of low surface area.

According to the present invention, the reaction of an $H_2/H_2O$ gas mixture with $UF_6$ gas at the specified conditions and feed compositions results in conversion of the $UF_6$ in a single process step to essentially uranium oxide $UO_2$ without formation of significant amounts of intermediate uranium compounds. The overall conversion may be represented by reaction (5):

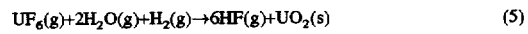

$$UF_6(g)+2H_2O(g)+H_2(g) \rightarrow 6HF(g)+UO_2(s) \qquad (5)$$

While reactions (1) or (2) (or other reactions) might occur on a molecular scale, the mixing of gases $H_2/H_2O$ and $UF_6$, or modifications thereof according to the invention, apparently allows reactions (3) or (4) to complete the conversion to uranium oxides while the intermediate products are still in a very finely divided (nearly molecular) state.

Thermochemical calculations can be used to identify the limiting requirements for the foregoing reactions. The equilibrium compositions were calculated for each uranium reactant and a ten percent excess of the other reactants. The results are given below as percentage conversions of the uranium feed over the most favorable range of temperature at atmospheric pressure. The adiabatic product temperatures for these feeds pre-heated at 700° C. were calculated as an indication of the heating or cooling requirements.

| Reaction No. | Equilibrium Conversion (for products in the indicated temperature range) | Resulting Adiabatic Product Temp. °C. for feeds at 700° C.) |
|---|---|---|
| 1 | ~100% for 0 to 2500° C. | 1885 |
| 2 | >99% for 0 to 750° C. | 1058 |
| 3 | >98% for 850 to 1300° C. | 639 |
| 4 | >98% for 850 to 1400° C. | −273 |
| 5 | >99% for 900 to 1300° C. | 1000 |

These thermochemical calculation results show that the reaction of $UF_6(g)$ with a mixture of $H_2(g)$ and $H_2O(g)$ (reaction (5)) provides a well-controlled conversion with a good yield of $UO_2$ and HF. The equilibrium conversions for reaction (5) are good over a 900° to 2000° C. range of temperatures. Reactants preheated to a reasonable temperature (700° C.) give products within this temperature range without reactor heat transfer for control. Additional excesses of $H_2$ or $H_2O$ feeds can be favorable to more complete conversions. The two products are solid ($UO_2$) and gaseous (HF) over wide temperature ranges, thus allowing simple physical separation of the products.

The four reactions (1) to (4) are much less favorable in one or more respects than reaction (5). Reaction (1) is very exothermic and will typically give $UF_4$ as a vapor or liquid requiring cooling to prepare the $UF_4(s)$ for subsequent reaction to $UO_2$ by reaction (4) in a second reactor. Reaction (4) is extremely endothermic and will require large heat inputs to hold the favorable range of temperatures. Reactions (2) and (3) are mildly exothermic and endothermic, respectively. But reaction (2) requires limiting the temperature to avoid thermal decomposition of the $UO_2F_2$ product. Reaction (3) must be carried out with a large excess of $H_2$ to complete the reaction without thermal decomposition of the $UO_2F_2$ feed. Only reaction (5) can be carried out to give a solid product and high conversions without large heat fluxes or large excesses of $H_2O$ or $H_2$ feeds.

For the conversion of $UF_6$ by reaction (5), all the oxygen may be supplied as $H_2O(g)$. Thermochemical calculations indicate that the feeds are preferably preheated to 700° C. so the products can be at an optimum temperature for complete conversion without requiring heat transfer from the reaction zone. The same conversion products could be formed with oxygen supplied by $O_2(g)$ as shown by reaction (6):

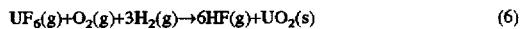

$$UF_6(g)+O_2(g)+3H_2(g) \rightarrow 6HF(g)+UO_2(s) \qquad (6)$$

Reaction (6) is very exothermic and feeds at 25° C. result in adiabatic product temperatures over 2000° C. This high temperature is undesirable from a practical viewpoint and is less favorable thermodynamically primarily because $UF_4(g)$ becomes a significant product.

The most practical conversion of $UF_6(g)$ to uranium oxides and HF involves supplying oxygen as both $O_2(g)$ and $H_2O(g)$ with the proportions controlled to control the product temperature. The reaction for half of the oxygen from $H_2O(g)$ and half from $O_2(g)$ is:

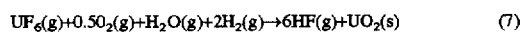

$$UF_6(g)+0.5O_2(g)+H_2O(g)+2H_2(g) \rightarrow 6HF(g)+UO_2(s) \qquad (7)$$

Since large heat fluxes are not needed and temperatures are limited, the design of the equipment is simplified and a relatively wide variety of materials of construction are acceptable for use. Thus, while ceramic materials such as alumina or graphite are generally preferred, the invention permits operations wherein the reactor wall may be substantially cooler than the reaction temperature, thus allowing the use of metals such as nickel or Monel. Resistance heating elements on the reactor wall may also be adequate. Alternatively, an induction heating system may be used to heat the reactor.

Adiabatic product temperatures were calculated using ten percent excesses of both oxygen and hydrogen with feeds at 25° C. and the division of oxygen supplied between $O_2(g)$ and $H_2O(g)$ as a variable. The results are:

| $UF_6$ Moles | $O_2$ Moles | $H_2O$ Moles | $H_2$ Moles | Adiabatic Product Temperature for products of 6HF(g) + $UO_2$ + $0.2H_2O(g)$ + $0.1H_2(g)$ |
|---|---|---|---|---|
| 1 | 0 | 2.2 | 1.1 | 370° C. |
| 1 | 0.15 | 1.9 | 1.4 | 637° C. |
| 1 | 0.30 | 1.6 | 1.7 | 891° C. |
| 1 | 0.45 | 1.3 | 2.0 | 1146° C. |
| 1 | 0.60 | 1.0 | 2.3 | 1389° C. |
| 1 | 0.75 | 0.7 | 2.6 | 1631° C. |
| 1 | 1.10 | 0 | 3.3 | 2143° C. |

The 1146° C. for $UF_6:O_2:H_2O$ molar ratio of 1:0.45:1.3 appears to be near the middle of the optimum temperature range. The amount of $O_2$ may be controlled from a temperature measurement. Less $O_2$ is needed if the feeds are preheated above 25° C.

Only two gaseous feed streams are needed since $H_2O$ and $H_2$ do not react with each other and $UF_6$ and $O_2$ do not react below 1000° C. A large excess of $H_2$ (e.g. greater than 50% theoretical) may be acceptable as the excess can be recycled after condensation of the HF product. The excess of $O_2$ should be well-controlled and small (up to, for example, 20% excess), particularly if an anhydrous HF product is desired to minimize the amount of water in the HF.

As will be evident from the foregoing, the process of the invention comprises reaction of two gaseous feed mixtures to give a one-step, efficient conversion of $UF_6$ into uranium oxide and HF. The gaseous feed compositions and temperatures are controlled to give the optimum compositions of uranium oxide and of gaseous products for recovery of condensed HF as a chemical of significant commercial value. In a preferred embodiment, one gaseous feed comprises $UF_6$, e.g. depleted $UF_6$, together with inert gas and/or part of the oxygen needed for the conversion. The other gaseous feed comprises hydrogen as $H_2$, $H_2O$, $NH_3$ or $CH_4$ and all or part of the required oxygen as $H_2O$ or $CO_2$. Increasing the fraction of oxygen supplied as $O_2$ will generally increase the reaction temperature or the temperature of the products after reaction. On the other hand, increasing the fraction of oxygen supplied as $H_2O$ or $CO_2$ will generally decrease the temperature of the product after reaction. The gaseous feeds may also be preheated before mixing to increase the temperature of the products after reaction. This control of temperature is important to simplify the design of process equipment. Avoiding excessive temperatures allows the use of nickel or other metals instead of ceramics. The control of temperatures without need for large heat fluxes at the reaction zone is also an important advantage or simplification.

Specific features of the invention include the following:

(1) The process provides uranium oxides from $UF_6$ which have useful properties sufficient to meet the requirements for storage, disposal or use of uranium.

(2) The process provides a one-step conversion of $UF_6$ into uranium oxide and HF. The $UF_6$ starting material and the other reactants are fed into a reaction zone to give readily separable solid and gaseous products.

(3) The process involves the feed of two or more gaseous feeds which are separately stable with compositions and temperatures that give a favorable thermodynamic equilibrium composition and temperature with little or no heat transfer during the reaction. One gaseous feed is the $UF_6$ with varying amounts of $O_2$ and/or inert diluent gas, such as Ar. The other gaseous feed includes one or more sources of hydrogen ($H_2$, $NH_3$, $H_2O$ or $CH_4$) and one or more sources of oxygen ($H_2O$, $CO_2$). The composition of each gaseous feed stream, the ratios of the two feed streams, and the temperatures of the feeds can be controlled and varied to provide the favorable thermodynamic equilibrium compositions and temperatures.

(4) The preferred reaction product temperatures for conversion of $UF_6$ into uranium oxides and HF are most commonly in the range of 900° to 2000° C.

(5) The preferred reaction pressure for conversion of $UF_6$ into uranium oxide and HF is commonly in the range of atmospheric, but elevated pressures can be accommodated.

(6) The process results in a gaseous product composition that can be controlled to allow recovery of HF for commercial use.

(7) The reaction temperature may be controlled by controlling the fractions of oxygen fed as $O_2$ and fed as $H_2O$ or $CO_2$. Increasing the fraction added as $O_2$ increases the temperature of the reaction products; increasing the fraction fed as $H_2O$ or $CO_2$ decreases the temperature. This control of temperature prevents excessive temperatures, minimizes or eliminates the need for heat transfer to and from the reaction zone and provides an optimum temperature for obtaining the compositions of products desired.

(8) The product compositions can be controlled and varied by varying the proportions of total oxygen to $UF_6$ and total hydrogen to $UF_6$ in the feeds. Since the oxygen in the feed can be from $O_2$ and $H_2O$ or $CO_2$ and the hydrogen can be from $H_2$ and $H_2O$, the control of oxygen/$UF_6$ and hydrogen/$UF_6$ ratios can be independent of the control of reaction temperature as described in (7).

(9) Control of temperature can also be accomplished by a controlled preheating of the gaseous feeds. For example, feeds of $UF_6$ (without $O_2$) and $H_2+H_2O$ can be preheated to about 700° C. to give an adiabatic reaction temperature within the preferred range of temperatures.

(10) The feed apparatus and procedures allow the gaseous feeds to be fed and reacted directly to final product without excessive corrosion or erosion by the feeds and without handling and plugging problems caused by bulk solids of uranium intermediates such as $UO_2F_2$ and $UF_4$. The conversion of $UF_6$ to uranium oxides is completed without need for a mixing of a gaseous feed with uranium solids of an intermediate composition (e.g. $UO_2F_2$ or $UF_4$). The mixing and reaction of a gas with bulk solids is commonly slower and more difficult than the mixing and reaction of gases. The elimination of such a process operation is a major difference between the present invention and prior art procedures.

(11) The two principal products in the present process are a solid (uranium oxide, primarily as $UO_2$) of very low volatility and gaseous HF which can be condensed when cooled. This allows easy and efficient separation of the uranium oxide product and the HF product by simple physical separation (e.g., filtration).

(12) The control of reaction temperatures and heat fluxes by controlling feed composition (more specifically, the oxygen content of the $UF_6$ feed) greatly simplifies the design of the process equipment. Some materials of construction and temperature control procedures are more practical for the process described than for highly exothermic or highly endothermic process reactions. Mildly exothermic process reactions might be contained by cooled metal reactor walls without the need for ceramics. Low heat fluxes through the reactor walls allow simpler heat transfer and temperature control designs.

(13) The process may be carried out continuously under substantially adiabatic conditions with the oxide solids and gaseous HF periodically or continuously removed from the reactor.

It will be appreciated that various modifications may be made in the invention as described above without deviating from the spirit and scope thereof as defined in the following claims wherein:

What is claimed is:

1. A single-step process for producing solid uranium oxide and gaseous HF from $UF_6$ which comprises bringing together two gaseous reactant streams wherein at least one of the streams is preheated to a temperature of 700°–1000° C. prior to bringing together, one of said streams comprising $UF_6$ optionally admixed with oxygen as $O_2$, and the second reactant stream comprising a mixture of hydrogen as $H_2$ or as a hydrogen-containing compound and oxygen as an oxygen-containing compound, said gaseous reactant streams being brought together in a reactor at a temperature and composition such that the $UF_6$ is converted rapidly by flame reaction into readily separable solid uranium oxide and a gaseous HF product.

2. The process of claim 1 wherein the reaction is carried out at essentially atmospheric pressure.

3. The process of claim 1 wherein the $UF_6$ is depleted $UF_6$ and the uranium oxide product comprises $UO_2$.

4. The process of claim 1 wherein the solid uranium oxide is separated from the gaseous HF product and the gaseous HF product is condensed to recover HF.

5. The process of claim 1 wherein the gaseous feed streams provide a reaction product having a temperature within the range of 900° C. to 2000° C.

6. The process of claim 5 wherein both gaseous feed streams are preheated to a temperature sufficient to yield products in the temperature range of 900° C. to 2000° C.

7. The process of claim 1 or claim 6 wherein the reactor is heated by external means to a temperature sufficient to yield products in the temperature range of 900° C. to 2000° C.

8. The process of claim 1 wherein the gaseous feed stream comprises $UF_6$ and $O_2$ and the temperature of the reaction product is controlled by controlling the amount of $O_2$ in said $UF_6$ feed stream.

9. The process of claim 1 wherein the ratio of hydrogen or oxygen to $UF_6$ is regulated to control the amount of $H_2O$ vapor in the gaseous HF product.

10. The process of claim 1 wherein one or both of the feed streams also includes an inert gas.

11. The process of claim 1 wherein one gaseous feed stream comprises $UF_6$ and $O_2$ and the other gaseous feed stream comprises $NH_3$ and $H_2O$.

12. The process of claim 1 wherein one gaseous feed stream comprises $UF_6$ and $O_2$ and the second gaseous feed stream comprises $H_2$ and $H_2O$.

13. The process of claim 1 wherein one gaseous feed stream comprises $UF_6$ and $O_2$ and the second gaseous feed stream comprises $H_2$ and $CO_2$.

14. The process of claim 11, 12 or 13 carried out at atmospheric pressure.

15. The process of claim 1 wherein the gaseous reactant streams are reacted at atmospheric pressure and a temperature of 900° to 2000° C. for less than a second.

16. The process of claim 15 wherein the process is carried out continuously with continuous removal of solid uranium oxide and gaseous HF product.

17. The process of claim 15 wherein the reaction is carried out at essentially atmospheric pressure.

18. The process of claim 1 wherein the reaction is carried out at a pressure above atmospheric but below 250 psia.

19. The process of claim 1 wherein the reaction is carried out at a pressure slightly below atmospheric in the range of 5 to 13 psia.

20. The process of claim 1 wherein the solid uranium product is separated from the HF by physical means internal to the reactor.

21. The process of claim 1 wherein the solid uranium product is separated from the HF by physical means external to the reactor.

22. The process of claim 1 where the oxygen and hydrogen feed gas proportions are near the stoichiometric amounts to fully convert $UF_6$ to $UO_2$.

23. The process of claim 1 where the oxygen and hydrogen feed gas proportions are in excess of stoichiometric but generally less than 1.5 times the stoichiometric amounts.

24. The process of claim 1 wherein the oxygen and hydrogen feed gas proportions are less than the stoichiometric amounts required to fully convert $UF_6$ to $UO_2$.

* * * * *